United States Patent
Kitazawa

(10) Patent No.: US 6,282,212 B1
(45) Date of Patent: Aug. 28, 2001

(54) REPEAT USE DATA INSERTING APPARATUS AND DIGITAL BROADCAST TRANSMITTING SYSTEM

(75) Inventor: Toshihiko Kitazawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/949,286

(22) Filed: Oct. 21, 1997

(30) Foreign Application Priority Data

Oct. 24, 1996 (JP) .................................................. 8-282608

(51) Int. Cl.$^7$ ................................. H04J 3/00; H04N 7/10
(52) U.S. Cl. ................................................. 370/537; 348/7
(58) Field of Search ..................................... 370/487, 490, 370/498, 465, 537, 538, 477; 348/9, 10, 12, 7

(56) References Cited

U.S. PATENT DOCUMENTS

| | | | |
|---|---|---|---|
| 5,027,400 | * 6/1991 | Baji et al. | 348/10 |
| 5,280,479 | 1/1994 | Mary . | |
| 5,515,106 | 5/1996 | Chaney et al. . | |
| 5,583,562 | * 12/1996 | Birch et al. | 348/12 |
| 5,886,731 | * 3/1999 | Ebisawa | 348/9 |

FOREIGN PATENT DOCUMENTS

| | | |
|---|---|---|
| 0 624 982 | 11/1994 | (EP) . |
| WO 95/15657 | 6/1995 | (WO) . |

OTHER PUBLICATIONS

Weiss, S.M., "Switching Facilities In MPEG–2: Necessary But Not Sufficient", SMPTE Journal, SMPTE Inc. Scarsdale, NY. vol. 104, No. 12, Dec. 1, 1995, pp. 788–802, XP000543847.

Sarginson, P.A., "MPEG–2: A Tutorial Introduction To The Systems Layer", IEE Colloquium on MPEG What It is and What It Isn't, GB, IEE, London, 1995, pp. 4–1–4–13, XP000560804.

* cited by examiner

Primary Examiner—Wellington Chin
Assistant Examiner—Brenda Pham
(74) Attorney, Agent, or Firm—Frommer Lawrence & Haug LLP; William S. Frommer; Bruno Polito

(57) ABSTRACT

A repeat use data inserting apparatus for repeatedly inserting repeat use data into program data in accordance with appropriate timings. The apparatus comprises a data holding unit and a data multiplexing unit. The data holding unit holds the repeat use data made of a plurality of material data in the form of separately encoded streams. The data multiplexing unit multiplexes separately encoded streams of a plurality of material data constituting the program data during a period other than a data insertion period during which the repeat use data is inserted into the program data. The data multiplexing unit further inserts repeatedly the repeat use data into the program data during the data insertion period by multiplexing the separately encoded streams of the plurality of material data constituting the repeat use data held in the data holding unit.

24 Claims, 11 Drawing Sheets

FIG. 6A

| FRAME | VF (m) |
|---|---|
| 1 | VD(1) |
| 2 | VD(2) |
| 3 | VD(3) |
| 4 | VD(4) |
| ---- | |

FIG. 6B

| FRAME | AF (m) |
|---|---|
| 1 | AD(1) |
| 2 | AD(2) |
| 3 | AD(3) |
| 4 | AD(4) |

FIG. 6C

| FRAME | SF (m) | |
|---|---|---|
| 1 | VSD(1) | ASD(1) |
| 2 | VSD(2) | ASD(2) |
| 3 | VSD(3) | ASD(3) |
| 4 | VSD(4) | ASD(4) |

SEQUENCE OF OUTPUT

REPEAT USE DATA INSERTING APPARATUS AND DIGITAL BROADCAST TRANSMITTING SYSTEM

BACKGROUND OF THE INVENTION

The present invention relates to a repeat use data inserting apparatus for inserting repeat use data into program data in accordance with appropriate timings, as well as to a digital broadcast transmitting system which comprises the repeat use data inserting apparatus and which transmits a unified stream of program data and repeat use data prepared by the repeat use data inserting apparatus.

Recent years have seen the commercialization of multi-channel digital broadcasting systems using advanced digital compression techniques to transmit numerous channels of program data in a single data stream. The multi-channel digital broadcasting system needs to have the capability of repeatedly inserting so-called repeat use data into each of a plurality of channels of program data in accordance with suitable timings. In the context of this specification, repeat use data refers to repeatedly used data during broadcast such as news clips and commercial messages.

SUMMARY OF THE INVENTION

It is an object of the present invention to provide a repeat use data inserting apparatus and a digital broadcast transmitting system using the apparatus, whereby the storage capacity and transfer rate for repeat use data are reduced, the process for changing time base information is eliminated, momentary interruption of video or audio data is averted, and generation of noise is suppressed.

One aspect of the present invention provides a repeat use data inserting apparatus for repeatedly inserting repeat use data into program data in accordance with appropriate timings, and a digital broadcast transmitting system for use with that apparatus, the repeat use data inserting apparatus comprising: data holding means for holding the repeat use data made of a plurality of material data in the form of separately encoded streams; and data multiplexing means for multiplexing separately encoded streams of a plurality of material data constituting the program data during a period other than a data insertion period during which the repeat use data is inserted into the program data, the data multiplexing means further inserting repeatedly the repeat use data into the program data during the data insertion period by multiplexing the separately encoded streams of the plurality of material data constituting the repeat use data held in the data holding means.

In the repeat data inserting apparatus and digital broadcast transmitting system of the invention, the repeat use data is held by the data holding means in the form of separately encoded stream of the plurality of material data. In that setup, during a period other than the data insertion period, the data multiplexing means multiplexes the separately encoded streams of the plurality of material data constituting the program data. During the data insertion period, the data multiplexing means multiplexes the separately encoded streams of the plurality of material data constituting the repeat use data held in the data holding means.

The program data and the repeat use data are multiplexed as described, and so are the separately encoded streams constituting the material data. As a result, a bit stream of repeat use data is repeatedly inserted into a bit stream of program data, whereby a unified stream of data is acquired.

Other objects and further features of the invention will be apparent from the following detailed description when read in conjunction with the accompanying drawings.

BRIEF DESCRIPTION OF THE DRAWINGS

FIGS. 6A, 6B and 6C are views of typical file structures for commercial data;

DESCRIPTION OF THE PREFERRED EMBODIMENTS

A repeat use data inserting apparatus and a digital broadcast transmitting system both embodying the invention will now be described in detail with reference to the accompanying drawings.

So far, repeat use data is inserted into program data through the use of one of two data inserting arrangements proposed as follows: the first arrangement involves having repeat use data not compressed upon insertion into the program data. The second arrangement requires that repeat use data be subject to compressed encoding and multiplexing before being inserted into program data.

Figure 12:
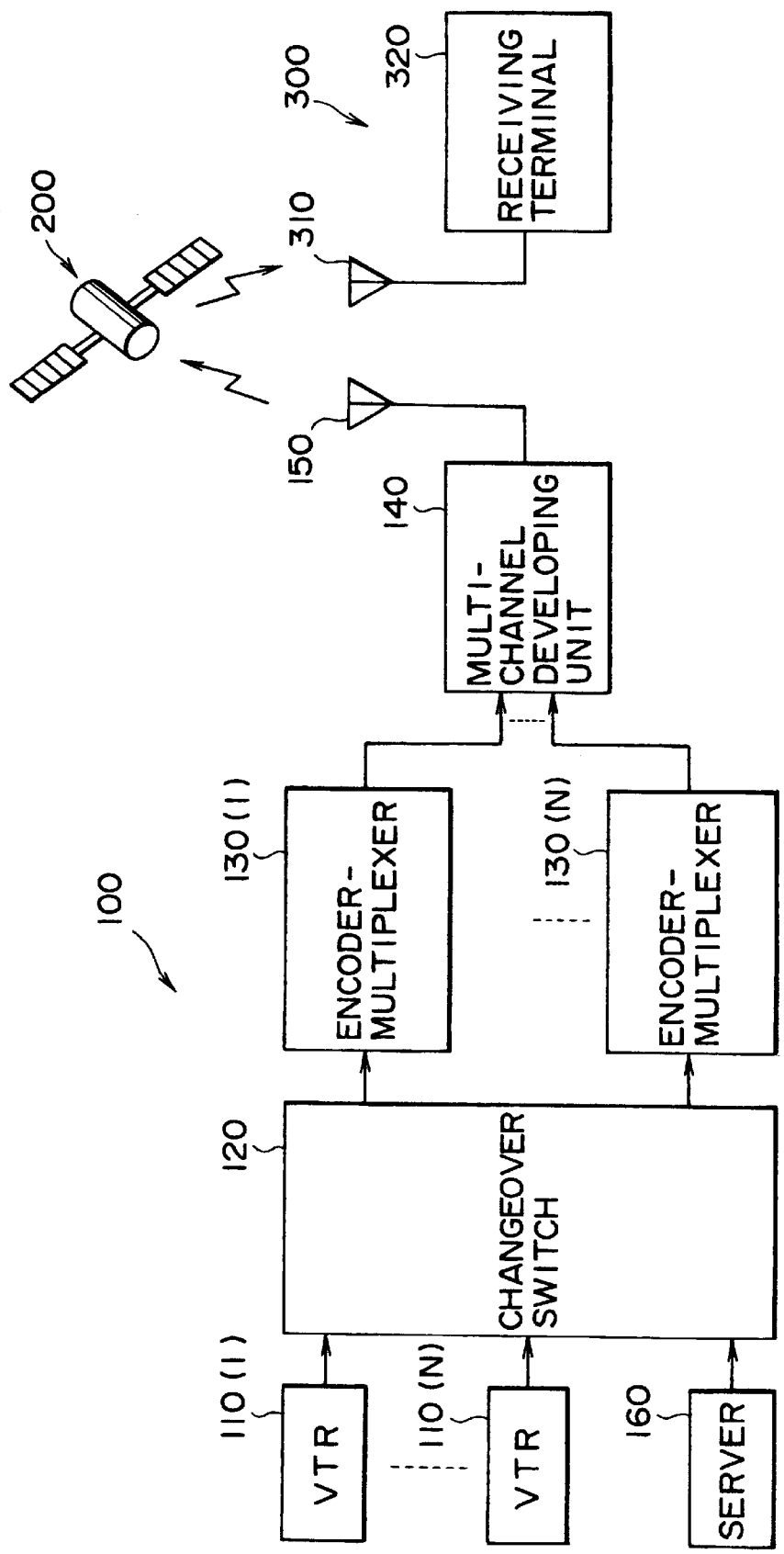
FIG. 12 is a block diagram of a system adopting a hitherto-proposed arrangement for inserting repeat use data into program data.

FIG. 12 is a block diagram of a multi-channel digital broadcasting system adopting the first arrangement for inserting repeat use data into program data.

The multi-channel digital broadcasting system of FIG. 12 comprises a digital broadcast transmitting system 100 installed in a broadcasting center, a communication satellite 200 for relaying transmitted data from the digital broadcast transmitting system 100, and a digital broadcast receiving system 300 installed in each viewer's household to receive the data relayed by the communication satellite 200.

The digital broadcast transmitting system 100 has N video tape recorders (VTRS) 110(1) through 110(N) for N channels (N is an integer of at least 2), a changeover switch 120, N encoder-multiplexers 130(1) through 130(N) for the N channels, a multi-channel developing unit 140, a transmitting antenna 150, and a server 160 for managing uncompressed repeat use data. Each digital broadcast receiving system 300 includes a receiving antenna 310 and a receiving terminal 320.

In the setup above, during a period where repeat use data is inserted into n (n=1–N) channels of program data (the period is called a data insertion period), uncompressed repeat use data from the server 160 is fed through the changeover switch 120 to the corresponding encoder-multiplexers 130(n). During a period other than the data insertion period (called a data noninsertion period), the program data from as many as n VTRs 110(n) for n channels are supplied through the changeover switch 120 to the encoder-multiplexers 130(n).

The data fed to the encoder-multiplexers 130(n) are compressed and encoded in terms of individual material data types (video data, audio data, etc.) before being multiplexed. The compression, encoding and multiplexing processes are implemented illustratively on the basis of MPEG (Moving Picture Experts Group) 2 specifications.

Multiplexed outputs comprising N channels of data are developed into multiple channels by the multi-channel developing unit 140 before being transmitted via the transmitting antenna 150. The transmitted data is relayed by the communication satellite 200 and received by the receiving antenna 310. The receiving terminal 320 separates data of a desired channel from the received data, decodes the separated output and reproduces the decoded data.

Figure 13:
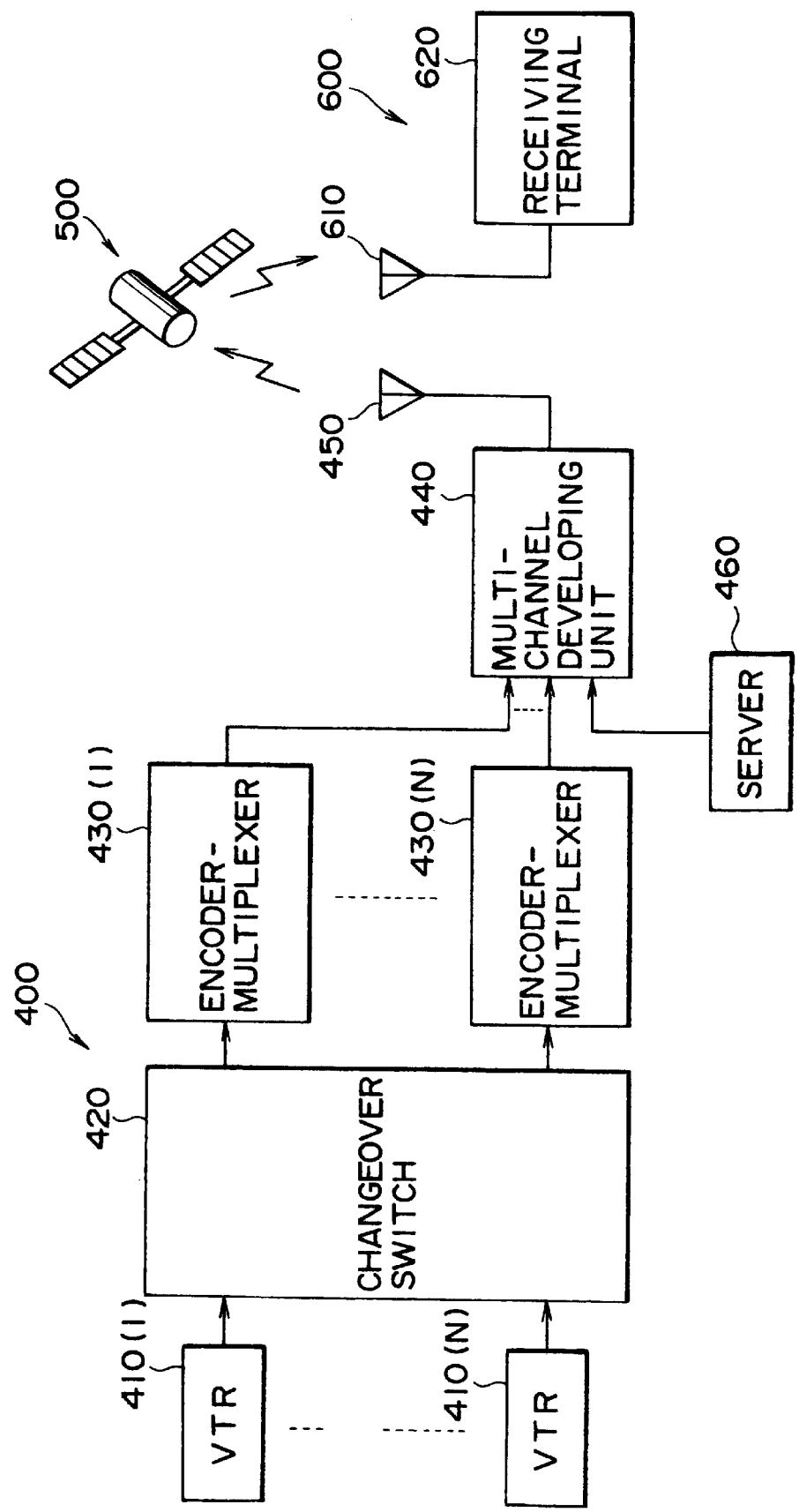
FIG. 13 is a block diagram of a system adopting another hitherto-proposed arrangement for inserting repeat use data into program data.

FIG. 13 is a block diagram of a multi-channel digital broadcasting system adopting the second arrangement for inserting repeat use data into program data.

The system of FIG. 13 includes a digital broadcast transmitting system 400, a communication satellite 500 and a digital broadcast receiving system 600. The digital broadcast transmitting system 400 comprises VTRs 410(1) through 410(N), a changeover switch 420, encoder-multiplexers 430(1) through 430(N), a multi-channel developing unit 440, a transmitting antenna 450, and a server 460 for managing repeat use data. The digital broadcast receiving system 600 has a receiving antenna 610 and a receiving terminal 620.

In the system of FIG. 13, the server 460 manages the repeat use data that are encoded and multiplexed. That is, the server 460 manages the repeat use data in the form of an MPEG2-based final bit stream called a transport stream. The repeat use data are fed to the multi-channel developing unit 440 during the data insertion period on n channels, to be multiplexed with the n channels of program data.

The above-described two arrangements for inserting repeat use data into program data have the following problems:

(1) The first arrangement uses uncompressed repeat use data. This amounts to an enormous quantity of repeat use data that must be accommodated by a storage medium of a sufficiently large capacity.

Generally, individual repeat use data items are limited in quantity. On the other hand, a multi-channel broadcast setup typically requires having about 1,000 items of repeat use data stored in the storage medium dedicated to such data. The total amount of repeat use data to be stored is huge even though the individual data items are small. Thus the first arrangement for inserting repeat use data into program data requires the use of a storage medium of a considerably large capacity.

Furthermore, the first arrangement above requires establishing for repeat use data a transfer rate high enough to cover all channels. The reason for this is that it is sometimes necessary to broadcast different commercial messages and news clips simultaneously on all channels. Thus the first arrangement for repeat use data insertion requires the use of a high-speed storage medium for holding repeat use data.

(2) The second arrangement for inserting repeat use data into program data involves having repeat use data compressed for storage. This means that the storage medium for accommodating repeat use data may be small in capacity and that the transfer rate for repeat use data may be lowered. Still, the need to have the repeat use data stored in a multiplexed fashion requires changing time base information (i.e., time management information) whenever the data are inserted into program data.

The second arrangement above has another problem. When program data and repeat use data are switched at a given point in time and transmitted, the video or audio part of the program can be interrupted momentarily or can generate noise upon such switchover. This is because the multi-channel digital broadcasting system, in an attempt to reduce the capacity of a buffer memory on the part of the receiving system 600, causes the transmitting system 400 to multiplex video data and audio data using time differences.

Figure 1:
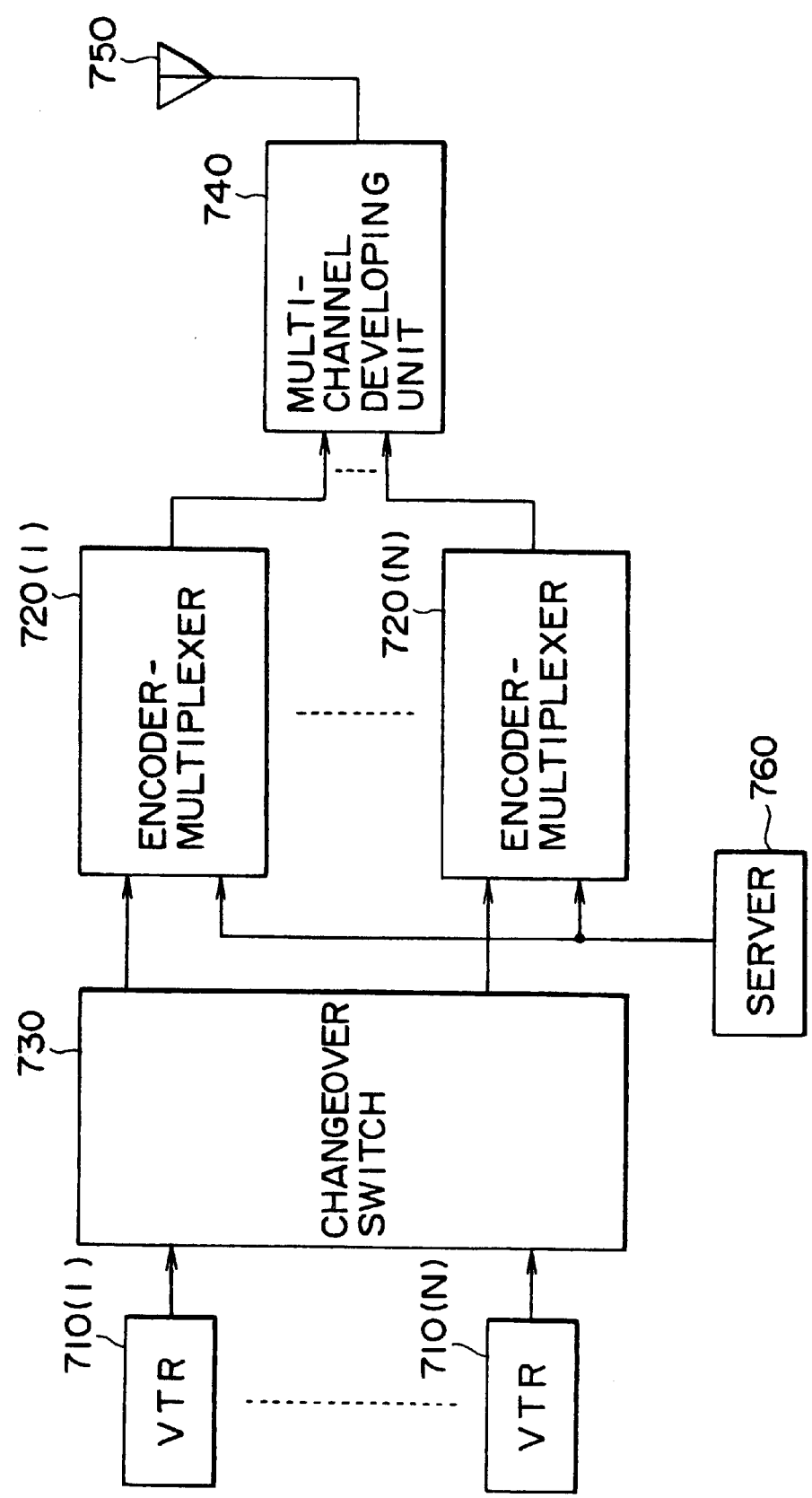
FIG. 1 is a block diagram of a repeat use data inserting apparatus and a digital broadcast transmitting system embodying the invention.

FIG. 1 is a block diagram of a digital broadcast transmitting system comprising a repeat use data inserting apparatus, the system and the apparatus embodying the invention.

The transmitting system of FIG. 1 comprises VTRs 710(1) through 710(N) corresponding to N channels (N is an integer of at least 2) and generating program data, encoder-multiplexers 720(1) through 720(N) that encode and multiplex the program data from the VTRs 710(1) through 710(N), a changeover switch 730 that connects the VTRs 710(1) through 710(N) with the encoder-multiplexers 720(1) through 720(N), a multi-channel developing unit 740 that develops multiplexed outputs from the encoder-multiplexers 720(1) through 720(N) into multiple channels, a transmitting antenna 750 that transmits the multi-channel output from the multi-channel developing unit 740, and a server 760 that manages repeat use data.

The server 760 manages the repeat use data in the form of separately encoded streams (elementary streams) representing a plurality of material data. The material data constituting the repeat use data typically include video data and audio data. The material data are generally compressed and encoded in accordance with MPEG2 specifications.

The setup above works as follows: during a data noninsertion period on n channels (n=1–N), the program data from the VTRs 710(n) for the n channels are fed via the changeover switch 730 to the encoder-multiplexers 720(n).

Having reached the encoder-multiplexers 720(n), the program data are compressed and encoded thereby in terms of individual material data types according to MPEG2 specifications. The process provides separately encoded streams reflecting the individual material data. Video data and audio data generally make up the material data constituting the program data.

A plurality of separately encoded streams from the data compression and encoding process above are multiplexed in accordance with MPEG2 specifications. This provides a single stream that unifies the separately encoded streams. The single stream is called a transport stream, one of MPEG2-based packet streams.

During a data insertion period, the encoder-multiplexers 720(n) are supplied with the separately encoded streams representing a plurality of material data constituting the repeat use data held in the server 760. The separately encoded streams fed to the encoder-multiplexers 720(n) are multiplexed thereby according to MPEG2 specifications. The process provides a single stream (transport stream) that unifies the separately encoded streams.

As described, the encoder-multiplexers 720(n) for the n channels multiplex the program data and repeat use data over the n channels, as well as the separately encoded streams representing the plurality of data constituting the data. In this manner, the process turns program data bit streams into a single stream into which repeat use data bit streams are inserted in accordance with predetermined timings.

In the multiplexing process, time base information is provided in order to synchronize the video and audio data. The time base information includes a decoding time stamp (DTS) indicating when to decode video data and audio data, a presentation time stamp (PTS) specifying when to reproduce and output the decoded video and audio data, and system clock reference (SCR) as well as program clock reference (PCR) designating the clock reference for decoding, reproduction and output.

The single stream coming out of the encoder-multiplexers 720(1) through 720(N) for the N channels is developed by the multi-channel developing unit 740 into multiple channels. That is, the unified stream representing the N channels is first multiplexed and then encoded and modulated in preparation for transmission. The multi-channel output is transmitted via the transmitting antenna 750.

Figure 2:
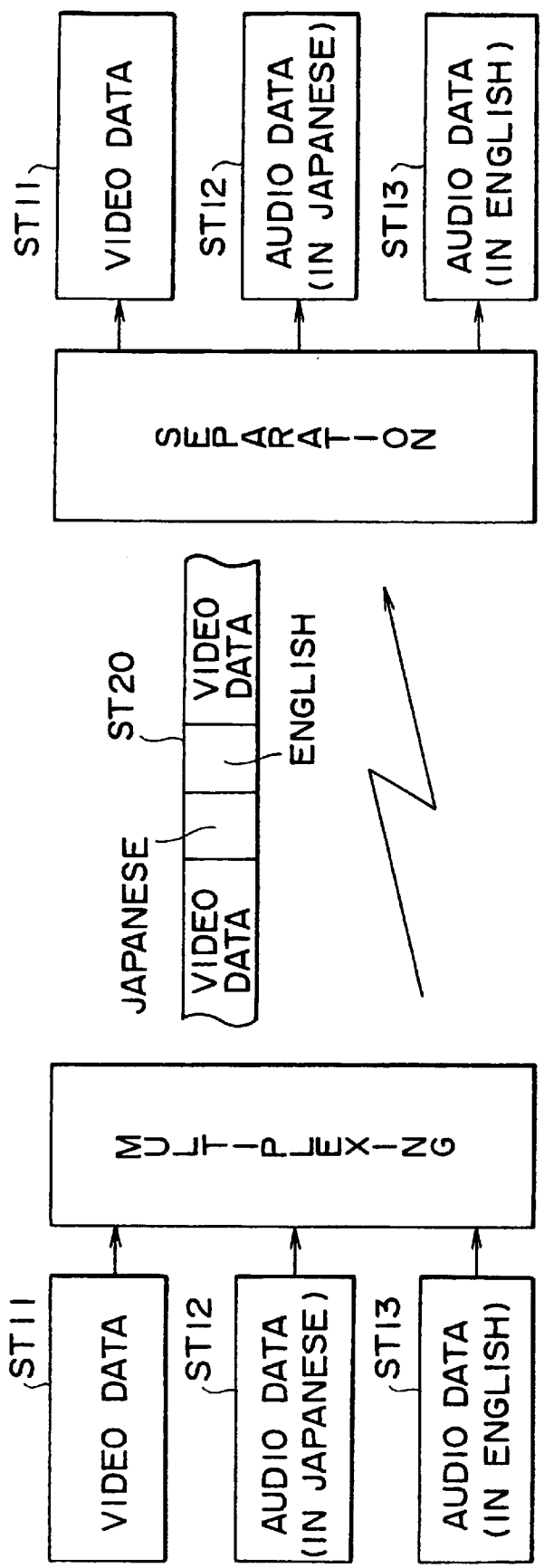
FIG. 2 is a conceptual view showing how program data are typically subjected to multiplexing and separating processes.

FIG. 2 is a conceptual view showing a multiplexing and a separating process dealing with separately encoded streams representing a plurality of material data constituting program data. The setup of FIG. 2 indicates audio data that is typically composed of two kinds of audio data, one in Japanese and the other in English.

Separately encoded streams ST11 through ST13 representing the three kinds of material data are multiplexed by the encoder-multiplexers 720(n). The process provides a single stream ST20 that unifies the three encoded streams ST11 through ST13. The unified stream ST20 is later separated into the separately encoded streams ST11 through ST13 by a receiving terminal included in the digital broadcast receiving system. The separately encoded streams denoting the repeat use data are also multiplexed and then separated in a similar manner, which will not be described further.

Figure 3:
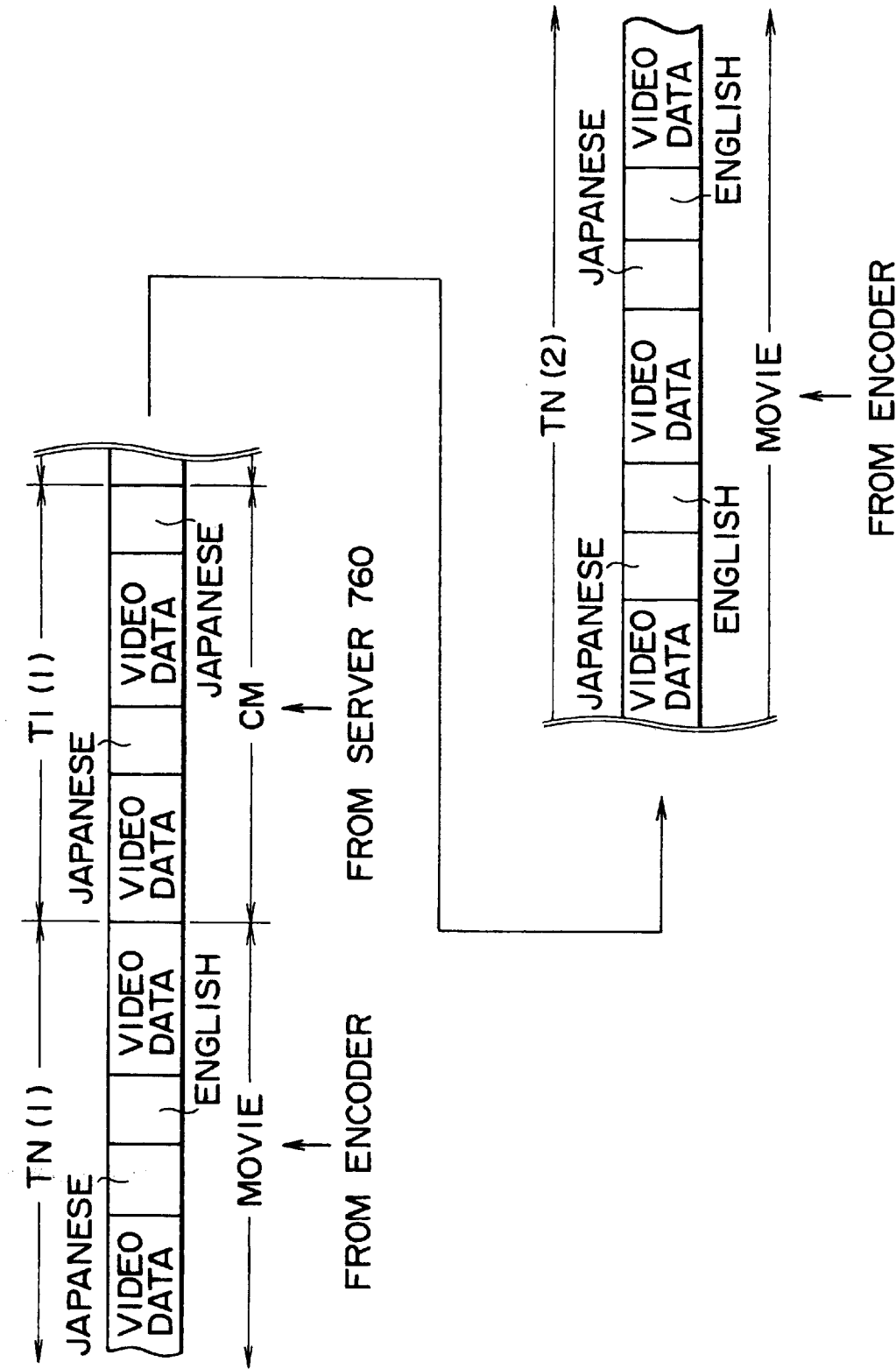
FIG. 3 is a schematic view sketching how program data and repeat use data are multiplexed.

FIG. 3 is a schematic view sketching how program data and repeat use data are multiplexed. FIG. 3 shows an example in which program data is constituted by movie data and repeat use data is made of commercial data CM (commercial messages). Furthermore, the movie data comprises video data, audio data in Japanese, and audio data in English; the commercial data includes video data and audio data in Japanese.

As shown in FIG. 3, during data noninsertion periods TN(1), TN(2), etc., the separately encoded streams representing the three material data constituting the movie data are multiplexed. During data insertion periods TI(1), etc., on the other hand, the separately encoded streams representing the two material data constituting the commercial data are multiplexed. The movie data and commercial data are thus multiplexed, and so are the separately encoded streams denoting the plurality of material data constituting these data. The process eventually provides a single stream that unifies the separately encoded streams representing the movie data and the streams representing the commercial data.

Figure 4:
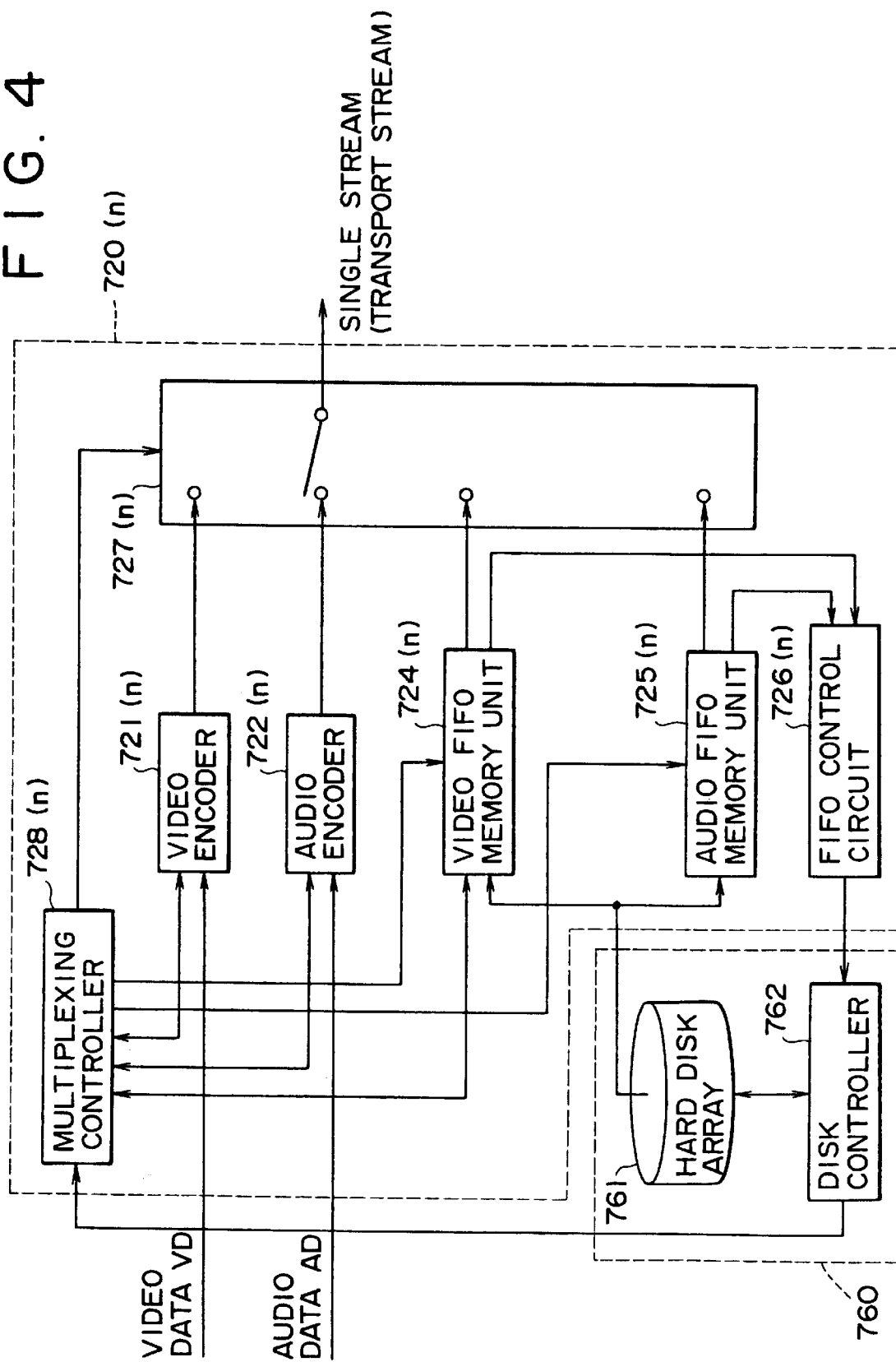
FIG. 4 is a block diagram showing how encoder-multiplexers and a server are illustratively configured.

FIG. 4 is a block diagram showing how the encoder-multiplexers 720(n) and the server 760 in FIG. 1 are illustratively configured.

As shown in FIG. 4, each encoder-multiplexer 720(n) includes a video encoder 721(n) that compresses and encodes video data VD constituting the program data from the VTR 710(n), and an audio encoder 722(n) that likewise compresses and encodes audio data AD. FIG. 4 shows an example in which one type of audio data AD is furnished.

The encoder-multiplexer 720(n) further comprises a video first-in first-out (FIFO) memory unit 724(n) for temporarily accommodating the video data VD constituting the repeat use data from the server 760, an audio FIFO memory unit 725(n) for temporarily holding the audio data AD from the server 760, and an FIFO control circuit 726(n) for detecting the quantity of the remaining data in the FIFO memory units 724(n) and 725(n).

In addition, the encoder-multiplexer 720(n) has a multiplexer 727(n) and a multiplexing controller 728(n) that controls the multiplexer 727(n) in operation. The multiplexer 727(n) multiplexes, in accordance with MPEG2 specifications, two separately encoded streams coming from the encoders 721(n) and 722(n) and another two separately encoded streams from the FIFO memory units 724(n) and 725(n). The multiplexing controller 728 is implemented illustratively by use of a central processing unit (CPU).

The server 760 comprises a hard disk array 761 for holding the repeat use data, and a disk controller 762 for controlling the hard disk array 761. The disk controller 762 is implemented illustratively by use of a computer.

Figure 5:
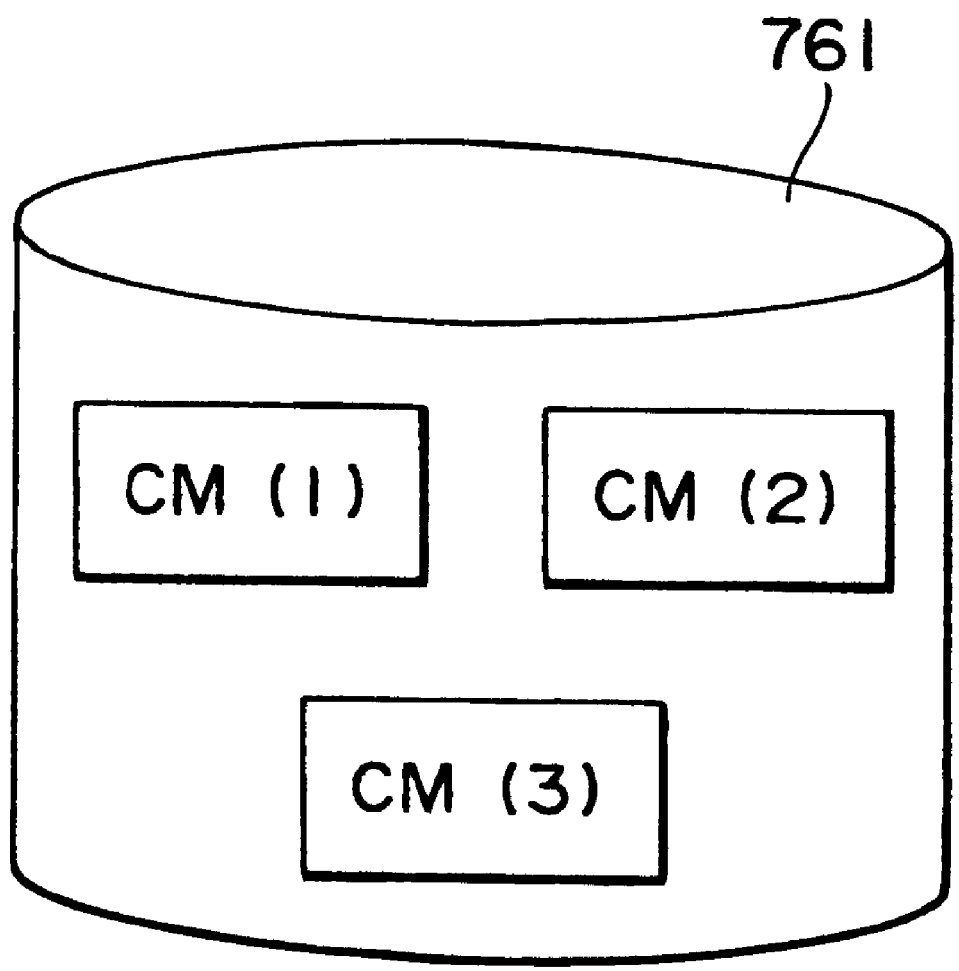
FIG. 5 is a schematic view of a data storage structure in a hard disk array.

FIG. 5 is a schematic view of a data storage structure in the hard disk array 761. The example of FIG. 5 shows repeat use data typically composed of commercial data. As illustrated, the hard disk array 761 has a file established for each of commercial messages CM(m) (m=1, 2, etc.).

As shown in FIGS. 6A through 6C, each file accommodating a commercial message CM(m) comprises a video file VF(m) (see FIG. 6A) for storing video data VD, an audio file AF(m) (see FIG. 6B) for holding audio data AD, and a size file SF(m) (see FIG. 6C) for retaining size data VSD and ASD.

The video file VF(m) has the video data VD stored in increments of frames. The audio file AF(m) has the audio data AD stored also in increments of frames. The size file SF(m) contains the size data VSD designating video data sizes and the size data ASD specifying audio data sizes, the two types of size data being stored in increments of frames.

The video data VD and audio data AD are stored in the form of separately encoded streams. The size data VSD and ASD, as they are stored, indicate the sizes in effect when the video data VD and audio data AD were compressed and encoded. The compression and encoding process above is carried out illustratively by one of the encoder-multiplexers 720(1) through 720(N) for program data while no program data is being compressed or encoded.

The setup above works as follows: during a data noninsertion period for each of n channel, the video data VD constituting the program data from the VTR 710(n) in FIG. 1 is fed to the video encoder 721(n); the audio data AD also making up the program data is fed to the audio encoder 722(n). The video data VD and audio data AD supplied to the encoders 721(n) and 722(n) are compressed and encoded thereby in accordance with MPEG2 specifications. The process provides separately encoded streams representing the video data VD and audio data AD. The two separately encoded streams are multiplexed by the multiplexer 727(n) into a unified stream (called a transport stream).

Also during the data noninsertion period for each of the n channels, the FIFO memory units 724(n) and 725(n) are supplied with the separately encoded streams representing the video data VD and audio data VD constituting the commercial data held in the hard disk array 761. The separately encoded streams thus transferred to the FIFO memory units 724(n) and 275(n), reflecting the video data VD and audio data AD, are multiplexed by the multiplexer 727(n). The multiplexing process provides a single stream (transport stream) that unifies the two separately encoded streams.

The multiplexer 727(n) is controlled in operation by the multiplexing controller 728(n). The transfer of the separately encoded streams from the hard disk array 761 to the FIFO memory units 724(n) and 725(n) is controlled by the disk controller 762.

Figure 7:
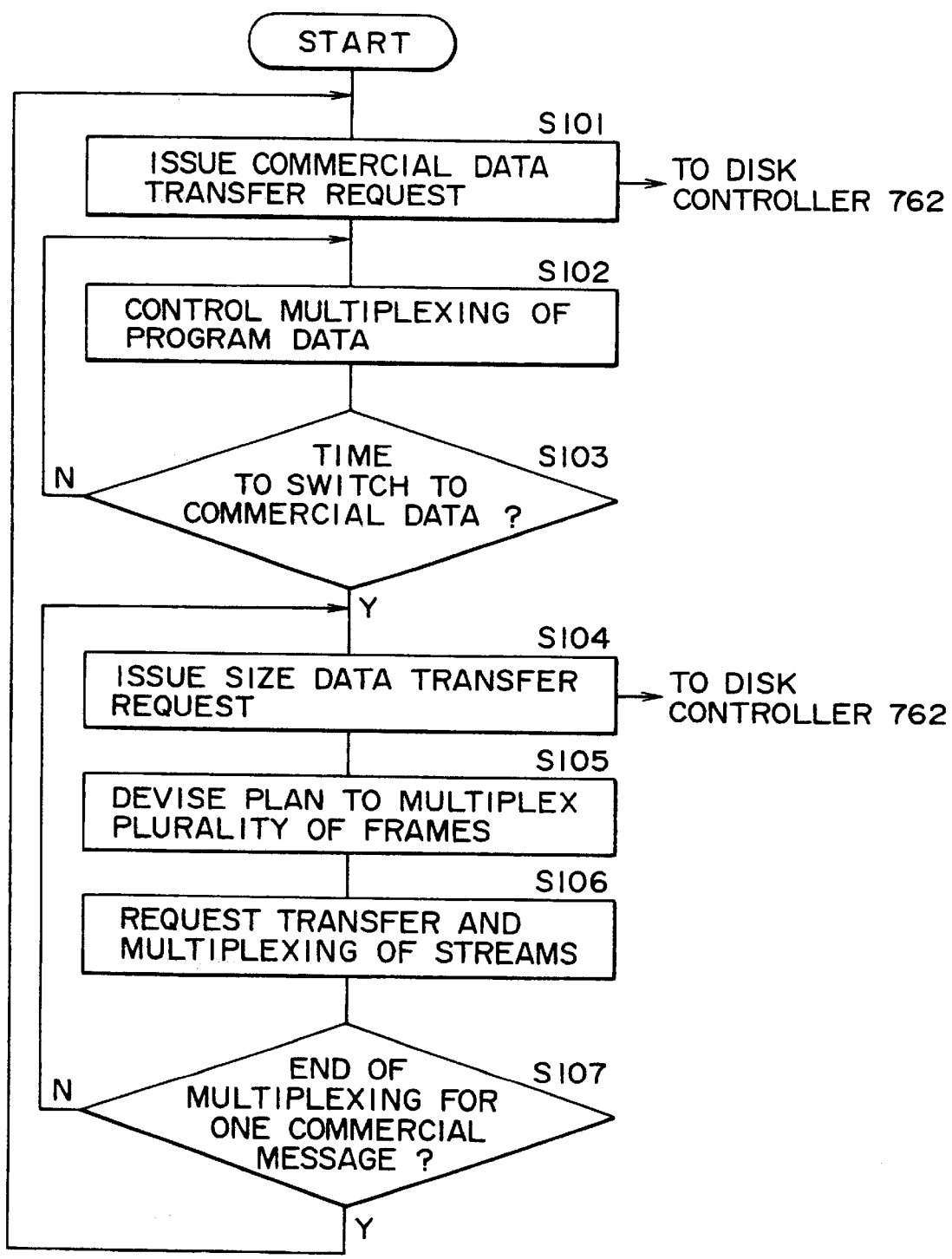
FIG. 7 is a flowchart of steps in which a multiplexing controller operates illustratively.

FIG. 7 is a flowchart of steps in which the multiplexing controller 728(n) operates illustratively. In the example of FIG. 7, it is assumed that repeat use data is commercial data. How the multiplexing controller 728(n) works will now be described with reference to FIG. 7.

In operation, the multiplexing controller 728(n) first requests the disk controller 762 to transfer commercial data (step S101). In turn, the data constituting the commercial message CM(m) held in the hard disk array 761 is transferred therefrom to the FIFO memory units 724(n) and 725(n).

In the case above, the FIFO memory unit 724(n) is fed with the separately encoded stream representing the video data VD held in the video file VF(m) for the commercial message CM(m); the FIFO memory unit 725(n) is supplied with the separately encoded stream representing the audio data AD held in the audio file AF(m). The data transfer process is carried out until the storage capacities of the FIFO memory units 724(n) and 725(n) are exhausted. The storage capacities are preset so as to accommodate data comprising a plurality of commercial messages CM(m). This means that the FIFO memory units 724(n) and 725(n) will hold data constituting multiple commercial messages CM(m).

The multiplexing controller 728(n) then controls multiplexing of program data (step S102). Under control of the controller 728(n), the multiplexer 727(n) multiplexes the separately encoded streams of the video data VD and audio data VD compressed and encoded by the encoders 721(n) and 722(n).

More specifically, the multiplexing process is controlled as follows: the multiplexing controller 728(n) asks the encoders 721(n) and 722(n) for size data VSD and ASD representing the sizes of the video data VD and audio data AD. In response, the encoders 721(n) and 722(n) supplies the multiplexing controller 728(n) with the size data VSD and ASD representing a plurality of frames (e.g., 15 frames) of video data VD and audio data AD.

Given the size data VSD and ASD about the multiple-frame data, the multiplexing controller 728(n) devises a plan to multiplex the video data VD and audio data AD. The multiplexing plan is a plan that specifies the quantities of video data VD and audio data AD to be multiplexed and the timings used for such multiplexing. The plan is provided so that video data VD may be compressed and encoded by a variable-length compression and encoding method. Without such a plan, the multiplexing process would involve unevenly transmitted excesses and shortages of video data VD leading to an imbalance between video data VD and audio data AD.

The multiplexing plan is established in increments not of a single frame but of a plurality of frames. This is because the plan needs to be optimized so as to take into consideration changes in data size per frame.

On the basis of the multiplexing plan thus devised, the multiplexing controller 728(n) requests the encoders 721(n) and 722(n) to transfer separately encoded streams representing a plurality of frames. At the same time, the multiplexing controller 728(n) requests the multiplexer 727(n) to multiplex the plurality of frames of separately encoded streams. As a result, the encoders 721(n) and 722(n) output the multiple frames of separately encoded streams in accordance with the multiplexing plan. These separately encoded streams are multiplexed by the multiplexer 727(n) according to the multiplexing plan.

When control over the multiple-frame multiplexing process is terminated, the multiplexing controller 728(n) checks to see if it is time to switch from program data to commercial data (step S103). That is, a check is made to see if the starting time of a data insertion period has arrived. If the time to switch to commercial data has yet to be reached, the multiplexing controller 728(n) goes back to step S102 to resume control over the multiplexing process. In step S102, the next batch of multiple frames is subjected to the multiplexing process. In this manner, the multiplexing process is allowed to continue under control of the multiplexing controller 728(n) until it is time to switch to commercial data.

When it is time to switch to commercial data, the multiplexing controller 728(n) requests the disk controller 762 to transfer the size data VSD and ASD denoting the sizes of commercial data (step S104). In turn, the multiplexing controller 728(n) is supplied with the size data VSD about video data and the size data ASD about audio data held in the size file SF(m) in the hard disk array 761. In this case, too, the size data VSD and ASD are furnished in increments of a plurality of frames.

On the basis of the size data VSD and ASD representing the multiple frames from the disk controller 762, the multiplexing controller 728(n) devises a plan to multiplex the plurality of frames of video data VD and audio data AD constituting the commercial data in question (step S105).

In accordance with the multiplexing plan thus provided, the multiplexing controller 728(n) requests the FIFO memory units 724(n) and 725(n) to transfer separately encoded streams representing the multiple frames. At the same time, the multiplexing controller 728(n) requests the multiplexer 727(n) to multiplex the plurality of frames of separately encoded streams. This causes the FIFO memory units 724(n) and 725(n) to output the multiple frames of separately encoded streams according to the multiplexing plan. These separately encoded streams are multiplexed by the multiplexer 727 in accordance with the multiplexing plan.

When control over the multiple-frame multiplexing process is terminated, the multiplexing controller 728(n) checks to see if the processing of one commercial message has ended (step S107). That is, a check is made to see if the ending time of the data insertion period has arrived. If the multiplexing process of one commercial message has yet to be terminated, the multiplexing controller 728(n) goes back to step S104 to resume control over the multiplexing process. The next batch of multiple frames is then subjected to the multiplexing process. In this manner, the multiplexing process is allowed to continue under control of the multiplexing controller 728(n) until the processing of one commercial message comes to an end.

When the multiplexing process of one commercial message has ended, the multiplexing controller 728(n) returns to step S101. The multiplexing controller 728(n) again starts controlling the multiplexing process of the program data and repeat use data. In like manner, every time the multiplexing process of one commercial message has ended, the steps described above are repeated.

Figure 8:
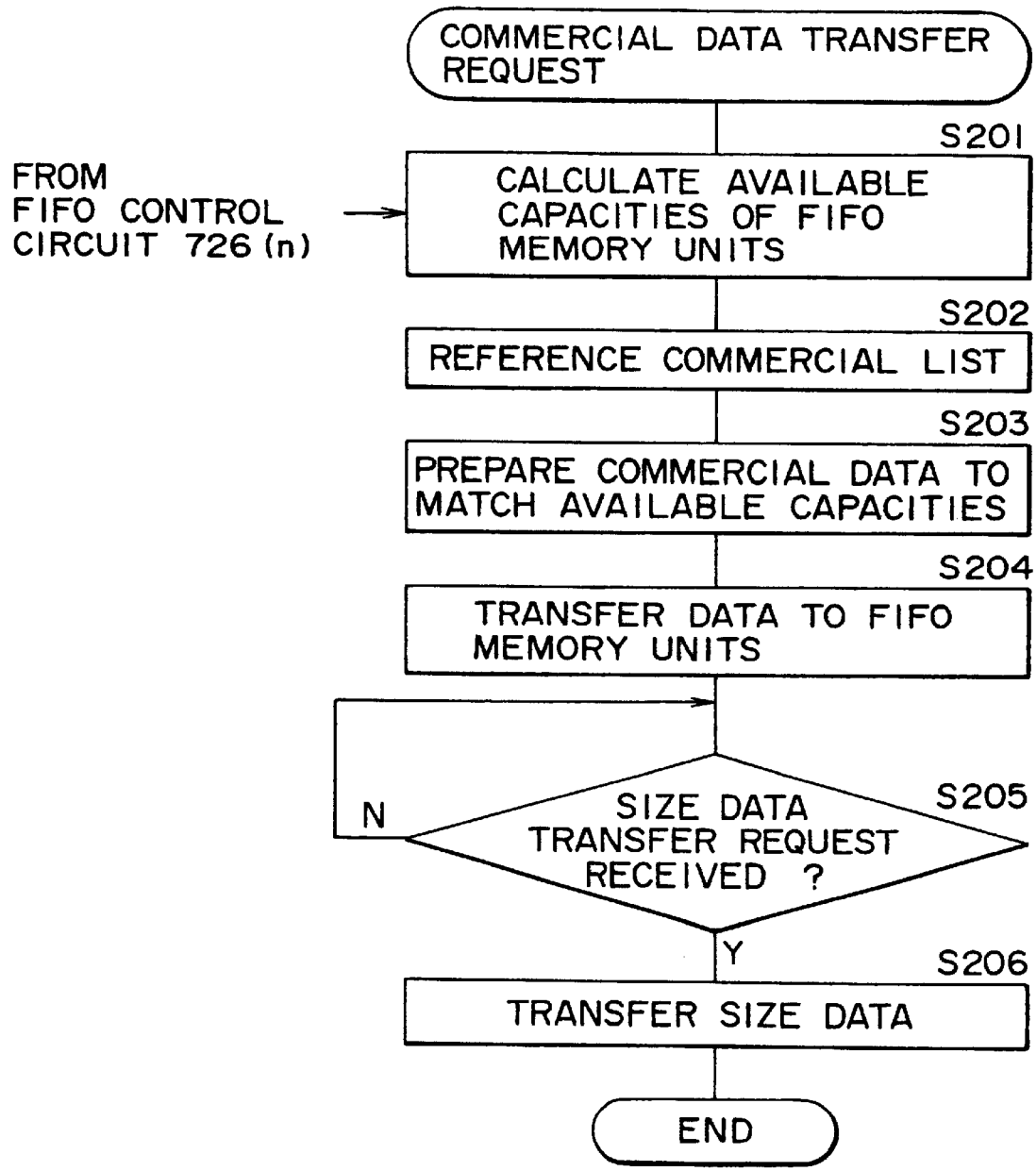
FIG. 8 is a flowchart of steps in which a disk controller operates illustratively.

FIG. 8 is a flowchart of steps in which the disk controller 762 operates illustratively. How the disk controller 762 works will now be described with reference to FIG. 8.

The steps in FIG. 8 are carried out every time the disk controller 762 receives a commercial data transfer request (output in step S111 of FIG. 7) from the multiplexing controller 728(n). Initially, the disk controller 762 calculates currently available capacities of the FIFO memory units 724(n) and 725(n) on the basis of the remaining commercial data detected by the FIFO control circuit 726(n)(step S201). If the received transfer request is a first request, the available capacities of the FIFO memory units 724(n) and 725(n) should match their storage capacities. If the transfer request is a second or a subsequent request, the currently available capacities match the data quantity of the commercial message CM(m) whose multiplexing process has just been terminated.

The disk controller 762 then references a commercial list of the n channels to determine the commercial message CM(m) whose data should be transferred from the hard disk array 761 to the FIFO memory units 724(n) and 725(n)(step 7202). The commercial list is a list that designates the sequence in which commercial messages CM(m) are to be output. The list is stored illustratively in an internal memory of the disk controller 762.

The disk controller 762 then prepares the data making up the commercial message CM(n) determined in step S202 by an amount matching the available capacities calculated in step S201 (step S203). Specifically, those video data VD and audio data AD that match in quantity the currently available capacities of the FIFO memory units 724(n) and 725(n) are read from the video file VF(m) and audio file AF(m) in the hard disk array 761.

The disk controller 762 transfers the prepared video data VD and audio data AD to the FIFO memory units 724(n) and 725(n). This should fill the two memory units with data to capacity.

The disk controller 762 checks to see if a request for the transfer of size data VSD and ASD (i.e., transfer request output in step S104 of FIG. 7) is received from the multiplexing controller 728(n)(step S205). The check is repeated until a transfer request has been sent in.

With a transfer request received, the disk controller 762 transfers to the multiplexing controller 728(n) the size data VSD and ASD on the commercial message CM(m) subject to multiplexing (step S206). The transfer is effected every time the size data VSD and ASD are read from the size file SF(m) in the hard disk array 761. With each transfer request received, size data VSD and ASD representing a plurality of frames are transferred. The transfer of size data is continued until no further transfer request is received.

With no further transfer request received, the process of transferring size data VSD and ASD comes to an end. When the transfer process is terminated, the disk controller 762 stops its control operation. Upon receipt of a new request for the transfer of commercial data from the multiplexing controller 728(n), the steps above are again carried out.

Figure 9:
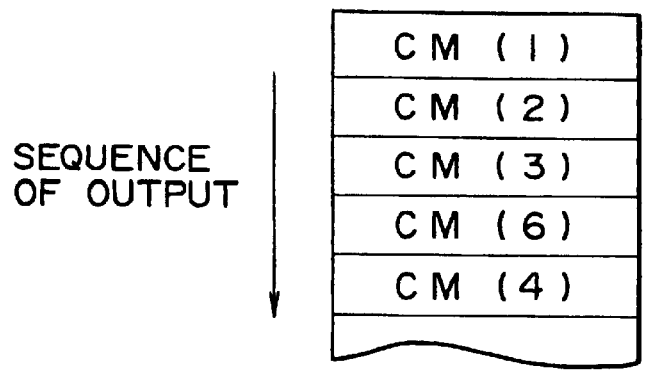
FIG. 9 is a view of a typical commercial list.

FIG. 9 is a view of a typical commercial list for n channels. The list in FIG. 9 shows a case in which commercial messages CM(m) numbered 1, 2, 3, 4, etc., are sent out in the order of CM(1), CM(2), CM(3), CM(6), CM(4), etc.

Figure 10:
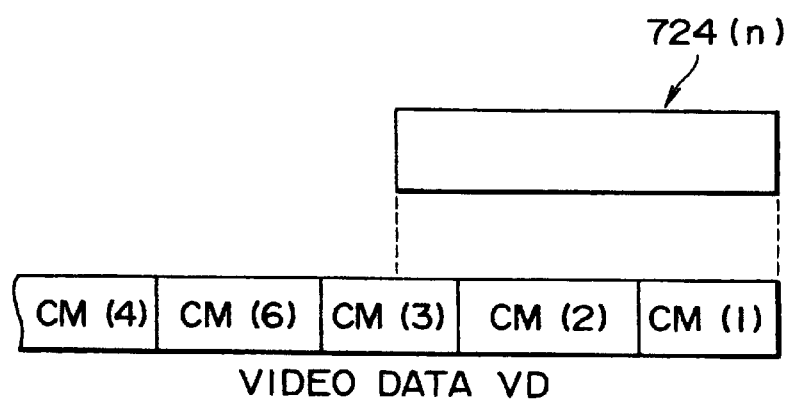
FIG. 10 is a schematic view showing the storage capacity of an FIFO memory unit.

FIG. 10 is a schematic view showing how the FIFO memory unit 724(n) is related in terms of storage capacity to the amount of video data VD to be accommodated thereinto. The video data VD in FIG. 10 are arranged in the same sequence in which the corresponding commercial messages CM(m) are output. As illustrated, the storage capacity of the FIFO memory unit 724(n) is set to be large enough to hold video data VD representing a plurality of commercial messages CM(m).

Figure 11A:
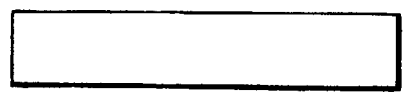
FIGS. 11A, 11B and 11C are schematic views showing how video data held in the FIFO memory unit vary.
Figure 11B:
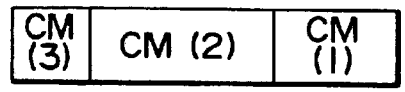
Figure 11C:
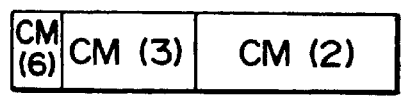

FIGS. 11A through 11C are schematic views showing how video data stored in the FIFO memory unit 724(n) vary. FIG. 11A shows a case in which the multiplexing controller 728(n) has yet to issue a request for the transfer of commercial data. In this case, the FIFO memory unit 724(n) has no video data VD stored therein.

FIG. 11B shows a case in which the multiplexing controller 728(n) has generated a first transfer request. In this case, the FIFO memory unit 724(n) accommodates illustratively video data VD representing two entire commercial messages CM(1) and CM(2) and video data VD constituting part of a commercial message CM(3).

FIG. 11C shows a case in which the multiplexing controller 728(n) has generated a second transfer request. In this case, the FIFO memory unit 724(n) is replenished with the amount of data corresponding to the vacancy left when the commercial message CM(1) was read out. As indicated in FIG. 11C, the memory unit is replenished with video data VD constituting the rest of the commercial message CM(3) and video data VD representing part of a commercial message CM(6). Now the FIFO memory unit 724(n) is set illustratively with the video data VD representing the entire commercial messages CM(2) and CM(3) as well as the video data VD constituting part of the commercial message CM(6).

In like manner, every time the multiplexing controller 728(n) generates a transfer request, the data-replenishing operation above is carried out. This keeps the FIFO memory unit 724(n) filled with video data. Similar processing, which will not be described further, is also performed on the FIFO memory unit 725(n) for audio data AD.

As described and according to the embodiments of the invention above, repeat use data may be stored as compressed. This feature reduces the amount of stored repeat use data, which in turn cuts back on the storage capacity for accommodating the data and lowers the transfer rate at which repeat use data are transferred.

With the embodiments of the invention, repeat use data may be stored in the form of separately encoded streams yet to be multiplexed. This feature dispenses with circuits for changing time base information, averts momentary interruption of video or audio data of the program, and suppresses generation of noise.

The embodiments above multiplex repeat use data by simply installing several additional multiplexers 727(n) for multiplexing program data. This arrangement forestalls increases in the scale of circuits.

The embodiments comprise the FIFO memory units 724(n) and 725(n) for buffer use which are fed with repeat use data during the data noninsertion period. This feature further reduces the transfer rate for repeat use data. Specifically, the transfer rate of the inventive structure is reduced to about T1/T2 (T1 stands for repeat use data output time and T2 for program data output time) compared with the second arrangement described earlier for inserting repeat use data into program data. This makes it possible to implement the hard disk array 761 in the form of a hard disk array of a significantly lower speed than the one ordinarily used. In addition, a low-transfer-rate cable such as an RS232C cable may be utilized for data transfer between the server 760, which is generally set up in a remote location, and the encoder-multiplexers 720(n).

Furthermore, the embodiments preserve the size data VSD and ASD acquired when repeat use data are compressed and encoded. This feature eliminates the need for a circuit to detect sizes of repeat use data.

More specifically, if the size data VSD and ASD about repeat use data were not retained, it would be necessary to detect the sizes of these data by referencing them upon read-out from the hard disk array 761. Such a structure would require separately installing a size detecting circuit. By contrast, the inventive structure holds the size data VSD and ASD obtained upon compression and encoding of repeat data, which makes a size detecting circuit unnecessary. Thus the embodiments help simply the entire circuit constitution.

Where a plan to multiplex repeat use data is to be established, the inventive structure devises the plan on the bases of the size data representing a plurality of frames. This makes it possible to take into consideration the changes in data size per frame. The feature permits providing a more appropriate multiplexing plan than the ordinary setup of devising a multiplexing plan based on the single-frame size data.

Although the description above contains many specificities, these should not be construed as limiting the scope of the invention but as merely providing illustrations of the presently preferred embodiments of this invention.

For example, the embodiments above have the FIFO memory units 724(n) and 725(n) as well as the FIFO control circuit 726(n) incorporated in each of the encoder-multiplexers 720(n). Alternatively, the incorporated components may be included in the server 760 instead.

With the above embodiments, the file SF dedicated to size data is furnished so as to accommodate the size data VSD and ASD about repeat use data. As an alternative, the size data may be contained in the video file VF or in the audio file AF.

The embodiments above comprise a single stage of buffer memory units (FIFO memory units 724(n) and 725(n) in the description above) for temporary storage of repeat use data. Alternatively, two stages of buffer memory units may be provided instead, the first stage making up a large-capacity buffer memory arrangement and the second stage constituting a small-capacity buffer memory setup.

Thus it is to be understood that changes and variations may be made without departing from the spirit and scope of the claims that follow.

The major benefits of this invention may be recapitulated as follows: according to the repeat use data inserting apparatus or digital broadcast transmitting system of the invention, repeat use data are stored as compressed. This feature reduces the amount of stored repeat use data, which in turn cuts back on the storage capacity for accommodating the data and lowers the transfer rate at which repeat use data are transferred.

According to the repeat use data inserting apparatus or digital broadcast transmitting system of the invention, repeat use data are stored in the form of separately encoded streams yet to be multiplexed. This feature dispenses with circuits for changing time base information, averts momentary interruption of video or audio data of the program, and suppresses generation of noise.

Also according to the repeat use data inserting apparatus or digital broadcast transmitting system of the invention, repeat use data are multiplexed by simply providing some additional means for multiplexing program data. This forestalls increases in the overall scale of circuits.

According to the repeat use data inserting apparatus or digital broadcast transmitting system of the invention, temporary storage means is provided to accommodate temporarily repeat storage data for each channel. During the data noninsertion period, repeat use data are transferred to the temporary storage means. This feature further lowers the necessary transfer rate for repeat use data, which makes it possible to implement the repeat use data holding means in the form of data holding means of a significantly lower speed than the one ordinarily used.

Further according to the repeat use data inserting apparatus or digital broadcast transmitting system of the invention, repeat use data are preserved along with their size data. This feature eliminates the need for a circuit to detect sizes of repeat use data.

What is claimed is:

1. A repeat use data inserting apparatus for repeatedly inserting repeat use data into program data during a data insertion period in accordance with appropriate timings, comprising:

data holding means for holding said repeat use data made of a plurality of material data in the form of separately encoded streams and for holding at least one size file indicating an amount of said repeat use data;

temporary holding means for reading and temporarily holding the repeat use data from said data holding means during a period other than said data insertion period; and data multiplexing means for multiplexing separately encoded streams of a plurality of material data constituting said program data during a period other than said data insertion period, said data multiplexing means further inserting repeatedly said repeat use data into said program data during said data insertion period by multiplexing the separately encoded streams of said plurality of material data constituting said repeat use data held in said temporary holding means.

2. A repeat use data inserting apparatus according to claim 1, wherein said temporary holding means includes:

holding means for temporarily holding said repeat use data;

remaining data detecting means for detecting the quantity of the repeat use data left in said holding means; and transfer means for transferring the repeat use data from said data holding means to said holding means during a period other than said data insertion period in accordance with a detection output from said remaining data detecting means, so that the repeat use data held in said holding means will reach a predetermined quantity.

3. A repeat use data inserting apparatus according to claim 1, wherein said data multiplexing means multiplexes, on the basis of said size file, the separately encoded streams of said plurality of material data constituting said repeat use data held in said data holding means.

4. A digital broadcast transmitting system for repeatedly inserting repeat use data into program data during a data insertion period so as to unify said repeat use data and said program data into one data stream and for transmitting the unified data stream, said digital broadcast transmitting system comprising:

program data encoding means for separately encoding a plurality of material data constituting said program data in order to generate the separately encoded streams of the material data;

data holding means for holding said repeat use data made of a plurality of material data in the form of separately encoded streams and for holding at least one size file indicating an amount of said repeat use data;

temporary holding means for reading and temporarily holding the repeat use data from said data holding means during a period other than said data insertion period; and data multiplexing means for multiplexing, during a period other than said data insertion period, the separately encoded streams of said plurality of material data constituting said program data output from said program data encoding means, said data multiplexing means further inserting repeatedly said repeat use data into said program data in accordance with appropriate timings during said data insertion period by multiplexing the separately encoded streams of said plurality of material data constituting said repeat use data held in said temporary holding means.

5. A digital broadcast transmitting system according to claim 4, wherein said temporary holding means includes:

holding means for temporarily holding said repeat use data;

remaining data detecting means for detecting the quantity of the repeat use data left in said holding means; and transfer means for transferring the repeat use data from said data holding means to said holding means during a period other than said data insertion period in accordance with a detection output from said remaining data detecting means, so that the repeat use data held in said holding means will reach a predetermined quantity.

6. A digital broadcast transmitting system according to claim 4, wherein said data multiplexing means multiplexes, on the basis of said size file, the separately encoded streams of said plurality of material data constituting said repeat use data held in said data holding means.

7. A digital broadcast transmitting system according to claim 4, wherein said program data encoding means receives a plurality of channels of program data and separately encodes each of said plurality of channels of program data; and wherein said data multiplexing means receives said plurality of channels of program data encoded by said data encoding means, and multiplexes each of said plurality of channels of program data with said repeat use data;

said digital broadcast transmitting system further comprising multi-channel developing means for developing into multiple channels said plurality of channels of multiplexed outputs from said data multiplexing means.

8. An apparatus for generating a transport stream from a plurality of source video data and a plurality of source audio data, the apparatus comprising:

encoding means for encoding said plurality of source video data to generate encoded video streams and for encoding said plurality of source audio data to generate encoded audio streams;

server means for supplying a plurality of commercial data comprising encoded streams;

buffer means for temporarily buffering said commercial data supplied from said server means;

multiplexing means for multiplexing said encoded video streams, said encoded audio streams and said commercial data; and control means for controlling a multiplexing schedule of said multiplexing means to generate said transport stream based on data sizes of said encoded video streams, said encoded audio streams and said commercial data.

9. A method for generating a transport stream from a plurality of source video data and a plurality of source audio data, comprising the steps of:

encoding said plurality of source video data to generate encoded video streams and encoding said plurality of source audio data to generate encoded audio streams;

supplying a plurality of commercial data comprising encoded streams to a buffer;

buffering said commercial data in said buffer;

multiplexing said encoded video streams, said encoded audio streams and said commercial data; and controlling a multiplexing schedule of said multiplexing to generate said transport stream based on data sizes of said encoded video streams, said encoded audio streams and said commercial data.

10. An apparatus for transmitting television programs comprising a plurality of source video data and a plurality of source audio data, the apparatus comprising:

encoding means for encoding said plurality of source video data to generate encoded video streams and for encoding said plurality of source audio data to generate encoded audio streams;

server means for supplying a plurality of commercial data comprising encoded streams;

buffer means for temporarily buffering said commercial data supplied from said server means;

multiplexing means for multiplexing said encoded video streams, said encoded audio streams and said commercial data;

control means for controlling a multiplexing schedule of said multiplexing means to generate a transport stream based on data sizes of said encoded video streams, said encoded audio streams and said commercial data; and means for transmitting said transport stream.

11. A method for transmitting television programs comprising a plurality of source video data and a plurality of source audio data, comprising the steps of:

encoding said plurality of source video data to generate encoded video streams and encoding said plurality of source audio data to generate encoded audio streams;

supplying a plurality of commercial data comprising encoded streams to a buffer;

buffering said commercial data in said buffer;

multiplexing said encoded video streams, said encoded audio streams and said commercial data;

controlling a multiplexing schedule of said multiplexing to generate a transport stream based on data sizes of said encoded video streams, said encoded audio streams and said commercial data; and transmitting said transport stream.

12. An apparatus for generating a transport stream from a plurality of source video data and a plurality of source audio data, the apparatus comprising:

encoding means for encoding said plurality of source video data to generate encoded video streams and for encoding said plurality of source audio data to generate encoded audio streams;

server means for supplying a plurality of commercial data comprising encoded streams;

buffer means for temporarily buffering said commercial data supplied from said server means; and multiplexing means for multiplexing said encoded video streams, said encoded audio streams and said commercial data in order to generate said transport stream and for adding a system clock reference and/or a program clock reference to said transport stream to enable said encoded video stream, said encoded audio stream and said commercial data to be decoded at a timing determined by said system clock reference and/or said program clock reference.

13. A method for generating a transport stream from a plurality of source video data and a plurality of source audio data, comprising the steps of:
    encoding said plurality of source video data to generate encoded video streams and encoding said plurality of source audio data to generate encoded audio streams;
    supplying a plurality of commercial data comprising encoded streams to a buffer;
    buffering said commercial data in said buffer;
    multiplexing said encoded video streams, said encoded audio streams and said commercial data in order to generate said transport stream; and
    adding a system clock reference and/or a program clock reference to said transport stream to enable said encoded video stream, said encoded audio stream and said commercial data to be decoded at a timing determined by said system clock reference and/or said program clock reference.

14. An apparatus for transmitting television programs including a plurality of source video data and a plurality of source audio data, the apparatus comprising:
    encoding means for encoding said plurality of source video data to generate encoded video streams and for encoding said plurality of source audio data to generate encoded audio streams;
    server means for supplying a plurality of commercial data comprising encoded streams;
    buffer means for temporarily buffering said commercial data supplied from said server means;
    multiplexing means for multiplexing said encoded video streams, said encoded audio streams and said commercial data in order to generate a transport stream and for adding a system clock reference and/or a program clock reference to said transport stream; and
    means for transmitting said transport stream, wherein said encoded video streams, said encoded audio streams and said commercial data included in a transmitted transport stream will be decoded at a timing determined by said system clock reference and/or said program clock reference.

15. A method for transmitting television programs including a plurality of source video data and a plurality of source audio data, comprising the steps of:
    encoding said plurality of source video data to generate encoded video streams and encoding said plurality of source audio data to generate encoded audio streams;
    supplying a plurality of commercial data comprising encoded streams to a buffer;
    buffering said commercial data in said buffer;
    multiplexing said encoded video streams, said encoded audio streams and said commercial data in order to generate a transport stream;
    adding a system clock reference and/or a program clock reference to said transport stream; and
    transmitting said transport stream, wherein said encoded video streams, said encoded audio streams and said commercial data included in a transmitted transport stream will be decoded at a timing determined by said system clock reference and/or said program clock reference.

16. An apparatus for generating a transport stream from a plurality of source video data and a plurality of source audio data, the apparatus comprising:
    encoding means for encoding said plurality of source video data to generate encoded video streams and for encoding said plurality of source audio data to generate encoded audio streams;
    server means for supplying a plurality of commercial data comprising encoded streams;
    buffer means for temporarily buffering said commercial data supplied from said server means; and
    multiplexing means for multiplexing said encoded video streams, said encoded audio streams and said commercial data in order to generate said transport stream and for adding a decoding time stamp and/or a presentation time stamp to said transport stream to enable said encoded video stream, said encoded audio stream and said commercial data to be decoded at a timing determined by said decoding time stamp and/or said presentation time stamp.

17. A method for generating a transport stream from a plurality of source video data and a plurality of source audio data, comprising the steps of:
    encoding said plurality of source video data to generate encoded video streams and encoding said plurality of source audio data to generate encoded audio streams;
    supplying a plurality of commercial data comprising encoded streams to a buffer;
    buffering said commercial data in said buffer;
    multiplexing said encoded video streams, said encoded audio streams and said commercial data in order to generate said transport stream; and
    adding a decoding time stamp and/or a presentation time stamp to said transport stream to enable said encoded video stream, said encoded audio stream and said commercial data to be decoded at a timing determined by said decoding time stamp and/or said presentation time stamp.

18. An apparatus for transmitting television programs including a plurality of source video data and a plurality of source audio data, the apparatus comprising:
    encoding means for encoding said plurality of source video data to generate encoded video streams and for encoding said plurality of source audio data to generate encoded audio streams;
    server means for supplying a plurality of commercial data comprising encoded streams;
    buffer means for temporarily buffering said commercial data supplied from said server means;
    multiplexing means for multiplexing said encoded video streams, said encoded audio streams and said commercial data in order to generate a transport stream and for adding a decoding time stamp and/or a presentation time stamp to said transport stream; and
    means for transmitting said transport stream, wherein said encoded video streams, said encoded audio streams and said commercial data included in a transmitted transport stream will be decoded at a timing determined by said decoding time stamp and/or said presentation time stamp.

19. A method for transmitting television programs including a plurality of source video data and a plurality of source audio data, comprising the steps of:
    encoding said plurality of source video data to generate encoded video streams and encoding said plurality of source audio data to generate encoded audio streams;

supplying a plurality of commercial data comprising encoded streams to a buffer;

buffering said commercial data in said buffer;

multiplexing said encoded video streams, said encoded audio streams and said commercial data in order to generate a transport stream;

adding a decoding time stamp and/or a presentation time stamp to said transport stream; and means for transmitting said transport stream, wherein said encoded video streams, said encoded audio streams and said commercial data included in a transmitted transport stream will be decoded at a timing determined by said decoding time stamp and/or said presentation time stamp.

20. A repeat use data inserting apparatus for repeatedly inserting repeat use data into program data during a data insertion period in accordance with appropriate timings, comprising:

data holding means for holding said repeat use data made of a plurality of material data in the form of separately encoded streams;

temporary holding means for reading and temporarily holding the repeat use data from said data holding means during a period other than said data insertion period, said temporary holding means including holding means for temporarily holding said repeat use data, remaining data detecting means for detecting the quantity of the repeat use data left in said holding means, and transfer means for transferring the repeat use data from said data holding means to said holding means during a period other than said data insertion period in accordance with a detection output from said remaining data detecting means, so that the repeat use data held in said holding means will reach a predetermined quantity; and data multiplexing means for multiplexing separately encoded streams of a plurality of material data constituting said program data during a period other than said data insertion period, said data multiplexing means further inserting repeatedly said repeat use data into said program data during said data insertion period by multiplexing the separately encoded streams of said plurality of material data constituting said repeat use data held in said temporary holding means.

21. A repeat use data inserting apparatus according to claim 20, further comprising size data holding means for holding size data about each of said plurality of material data constituting said repeat use data;

wherein said data multiplexing means multiplexes, on the basis of said size data held in said size data holding means, the separately encoded streams of said plurality of material data constituting said repeat use data held in said data holding means.

22. A digital broadcast transmitting system for repeatedly inserting repeat use data into program data during a data insertion period so as to unify said repeat use data and said program data into one data stream and for transmitting the unified data steam, said digital broadcast transmitting system comprising:

program data encoding means for separately encoding a plurality of material data constituting said program data in order to generate the separately encoded streams of the material data;

data holding means for holding said repeat use data made of a plurality of material data in the form of separately encoded streams;

temporary holding means for reading and temporarily holding the repeat use data from said data holding means during a period other than said data insertion period, said temporary holding means including holding means for temporarily holding said repeat use data, remaining data detecting, means for detecting the quantity of the repeat use data left in said holding means, and transfer means for transferring the repeat use data from said data holding means to said holding means during a period other than said data insertion period in accordance with a detection output from said remaining data detecting means, so that the repeat use data held in said holding means will reach a predetermined quantity; and data multiplexing means for multiplexing, during a period other than said data insertion period, the separately encoded streams of said plurality of material data constituting said program data output from said program data encoding means, said data multiplexing means further inserting repeatedly said repeat use data into said program data in accordance with appropriate timings during said data insertion period by multiplexing the separately encoded streams of said plurality of material data constituting said repeat use data held in said temporary holding means.

23. A digital broadcast transmitting system according to claim 22, further comprising size data holding means for holding size data about each of said plurality of material data constituting said repeat use data;

wherein said data multiplexing means multiplexes, on the basis of said size data held in said size data holding means, the separately encoded streams of said plurality of material data constituting said repeat use data held in said data holding means.

24. A digital broadcast transmitting system according to claim 22, wherein said program data encoding means receives a plurality of channels of program data and separately encodes each of said plurality of channels of program data; and wherein said data multiplexing means receives said plurality of channels of program data encoded by said data encoding means, and multiplexes each of said plurality of channels of program data with said repeat use data;

said digital broadcast transmitting system further comprising multi-channel developing means for developing into multiple channels said plurality of channels of multiplexed outputs from said data multiplexing means.

* * * * *